United States Patent
Lim et al.

(10) Patent No.: US 11,123,716 B2
(45) Date of Patent: Sep. 21, 2021

(54) DENITRIFICATION CATALYST FOR VESSEL, USING CERAMIC NANOTUBES GROWN ON POROUS METAL STRUCTURE, AND PREPARATION METHOD THEREOF

(71) Applicant: KOREA INSTITUTE OF INDUSTRIAL TECHNOLOGY, Cheonan-si (KR)

(72) Inventors: Dongha Lim, Busan (KR); Uoochang Jung, Busan (KR); Haeyoung Jeong, Busan (KR); Yunjang Gu, Changwon-si (KR)

(73) Assignee: KOREA INSTITUTE OF INDUSTRIAL TECHNOLOGY, Cheonan-si (KR)

( * ) Notice: Subject to any disclaimer, the term of this patent is extended or adjusted under 35 U.S.C. 154(b) by 458 days.

(21) Appl. No.: 16/312,742

(22) PCT Filed: Jun. 21, 2017

(86) PCT No.: PCT/KR2017/006542
§ 371 (c)(1),
(2) Date: Dec. 21, 2018

(87) PCT Pub. No.: WO2017/222306
PCT Pub. Date: Dec. 28, 2017

(65) Prior Publication Data
US 2019/0217279 A1    Jul. 18, 2019

(30) Foreign Application Priority Data

Jun. 21, 2016    (KR) .................. 10-2016-0077617

(51) Int. Cl.
*B01J 23/847*    (2006.01)
*B01J 37/08*    (2006.01)
(Continued)

(52) U.S. Cl.
CPC ............. *B01J 23/847* (2013.01); *B01J 23/16* (2013.01); *B01J 23/22* (2013.01); *B01J 23/70* (2013.01);
(Continued)

(58) Field of Classification Search
CPC . B01J 23/874; B01J 23/16; B01J 23/22; B01J 23/70; B01J 35/0013; B01J 35/002;
(Continued)

(56) References Cited

U.S. PATENT DOCUMENTS

2010/0006134 A1*   1/2010   Nakayama ............. B01J 35/026
                                                        136/244

FOREIGN PATENT DOCUMENTS

KR          10-0584961 B1      5/2006
KR     10-2010-0055839 A      5/2010
(Continued)

OTHER PUBLICATIONS

International Search Report for PCT/KR2017/006542 dated Sep. 28, 2017 from Korean Intellectual Property Office.
(Continued)

*Primary Examiner* — James A Fiorito
(74) *Attorney, Agent, or Firm* — Paratus Law Group, PLLC (57) ABSTRACT

A denitrification catalyst using ceramic nanotubes grown on a porous metal structure, including: a porous metal structure having a plurality of pores formed between metal supports such that exhaust gas penetrates through the pores in multiple directions; ceramic nanotubes grown on the porous metal structure through anodic oxidation; and an active material uniformly and highly dispersed as a nano-thin film layer on inner and outer surfaces of the ceramic nanotubes through a deposition or supporting process.

7 Claims, 7 Drawing Sheets

(51) Int. Cl.
| | |
|---|---|
| *F01N 3/28* | (2006.01) |
| *B01J 23/70* | (2006.01) |
| *B01J 35/00* | (2006.01) |
| *B01J 23/22* | (2006.01) |
| *B01J 37/02* | (2006.01) |
| *B01J 35/06* | (2006.01) |
| *B01J 23/16* | (2006.01) |
| *B01J 35/02* | (2006.01) |
| *F01N 3/20* | (2006.01) |
| *B01J 21/06* | (2006.01) |

(52) U.S. Cl.
CPC ......... *B01J 35/002* (2013.01); *B01J 35/0013* (2013.01); *B01J 35/026* (2013.01); *B01J 35/06* (2013.01); *B01J 37/02* (2013.01); *B01J 37/0226* (2013.01); *B01J 37/08* (2013.01); *F01N 3/2066* (2013.01); *F01N 3/2803* (2013.01); *F01N 3/2825* (2013.01); *B01J 21/063* (2013.01); *B01J 2523/15* (2013.01); *B01J 2523/55* (2013.01); *B01J 2523/56* (2013.01); *B01J 2523/67* (2013.01); *B01J 2523/84* (2013.01); *F01N 2330/02* (2013.01); *F01N 2610/02* (2013.01)

(58) Field of Classification Search
CPC . B01J 35/026; B01J 35/06; B01J 37/02; B01J 37/0226; B01J 37/08; F01N 3/2066; F01N 3/2803; F01N 3/2825
See application file for complete search history.

(56) References Cited

FOREIGN PATENT DOCUMENTS

| | | |
|---|---|---|
| KR | 10-2014-0119331 A | 10/2014 |
| KR | 10-2015-0062611 A | 6/2015 |

OTHER PUBLICATIONS

Kim, Hyun-Seung et al., "Fabrication and Characterization of Functionally Graded Nano-Micro Porous Titanium Surface by Anodizing", Journal of Biomedical Materials Research Part B: Applied Biomaterials, Feb. 2009, pp. 427-435, vol. 88B, No. 2.

Kim, Nam-Gyoung et al., "Development on New Catalyst Technology for Compact SCR Modularization for Ship", The Korean Society of Industrial and Engineering Chemistry 2016 Spring Meeting and Conference, Apr. 29, 2016, Presentation Materials pp. 1-4.

Gu, Yun-Jang et al., "Technical Development of Modulization for the Compact SCR Catalyst corresponding to IMO Tier III", 2016 The Korean Society of Industrial and Engineering Chemistry Spring Meeting and Conference, May 3, 2016, Presentation Materials pp. 1-4.

Kim, Nam-Gyoung et al., "Development of a New Type Eco-friendly Marine SCR Catalyst for the IMO Tier III Implementation", 2016 KOSECC, Spring Conference, May 26, 2016, Presentation Materials pp. 1-3.

\* cited by examiner

| Element | Wt % | |
| --- | --- | --- |
| | Before coating | After coating |
| C | 10.87 | 4.97 |
| O | 49.64 | 44.40 |
| Ti | 39.49 | 45.96 |
| V | 0 | 4.68 |
| Total | 100.00 | 100.00 |

| Classification | SCR catalyst using metal structure | SCR catalyst using ceramic support |
|---|---|---|
| Capex | Low | High |
| Opex | Low | High |
| Size of SCR reactor | Small | Slightly large |
| NOx removal performance | High | Slightly low |
| Installation, replacement, and maintenance | Easy | Slightly difficult |
| Durability | Good | Fair |

FIG. 8A

| Reactor | Reactor for SCR catalyst using ceramic support | Reactor for SCR catalyst using metal structure |
|---|---|---|
| Displacement | 5.2 MW | 5.2 MW |
| Volume | 12.5 m³ | 8.1 m³ |
| Comparison | 100% | 65% (▼ 35%) |

FIG. 8B

DENITRIFICATION CATALYST FOR VESSEL, USING CERAMIC NANOTUBES GROWN ON POROUS METAL STRUCTURE, AND PREPARATION METHOD THEREOF

CROSS REFERENCE TO PRIOR APPLICATIONS

This application is a National Stage Patent Application of PCT International Patent Application No. PCT/KR2017/006542 (filed on Jun. 21, 2017) under 35 U.S.C. § 371, which claims priority to Korean Patent Application No. 10-2016-0077617 (filed on Jun. 21, 2016), which are all hereby incorporated by reference in their entirety.

BACKGROUND

The present invention relates to a denitrification catalyst for a vessel, using ceramic nanotubes grown on a porous metal structure, and a preparation method thereof, and more particularly, to a high-efficiency denitrification catalyst for a vessel, using ceramic nanotubes with a high specific surface area grown on a porous metal structure through anodic oxidation and including an active material highly dispersed as a nano-thin film layer on inner and outer surfaces of the ceramic nanotubes through a deposition or supporting process, and a preparation method thereof.

Gas emitted as a result of the combustion of hydrocarbon-based fuels such as gasoline or diesel fuel may cause serious air pollution. Contaminants in the exhaust gas are compounds containing hydrocarbon and oxygen, and include nitrogen oxide ($NO_x$), sulfur oxide ($SO_x$), carbon monoxide (CO), etc. Therefore, an attempt to reduce the amount of hazardous gas emitted from the combustion system of a coal-fired thermal power plant, an incinerator, a vehicle, a vessel, etc. has been made around the world over several decades.

Since the past, the technologies used to effectively remove nitrogen oxide can be roughly classified into three types: firstly, a selective catalytic reduction (SCR) technology using both a catalyst and a reductant; secondly, a selective non-catalytic reduction (SNCR) technology using only a reductant without a catalyst; and thirdly, a Low-$NO_x$ Burner (LNB) technology configured to control combustion conditions in the combustion system.

Comprehensively considering secondary pollution, removal efficiency, operating costs, etc., it is evaluated that the SCR technology among the three technologies is most effective. In the case of a conventional SCR technology, the nitrogen oxide removal efficiency is 90% or more, and the duration of use is estimated to be about 2 to 5 years.

Generally, a denitrification catalyst used in the SCR technology is largely composed of an active metal (active site) and a support. The active metal mainly is in the form of oxides of vanadium, tungsten, molybdenum, etc., and examples of the support include titania ($TiO_2$), alumina ($Al_2O_3$), silica ($SiO_2$), and a mixture thereof. In particular, titania ($TiO_2$) is mainly used as the support of a catalyst used in the conventional SCR technology due to catalytic activity and toxicity.

According to the SCR technology, the above-described active metals in the form of oxides are supported in a ceramic support to prepare a denitrification catalyst, and the catalyst thus prepared is mixed with various additives such as a binder and the like and then subjected to injection molding to finally prepare a support in the form of a honeycomb, a plate, corrugation, etc. Then, when exhaust gas penetrates through the denitrification catalyst in the form of the support thus prepared, the denitrification catalyst is reacted with toxic gases such as nitrogen oxide to induce reduction, and thus the exhaust gas is converted to a harmless substance.

Korean Registered Patent No. 10-0584961 relates to a preparation method of a selective reduction catalyst coating for denitrifying exhaust gas and a support prepared by the catalyst preparation method, and discloses a ceramic support in a honeycomb form which supports an active metal catalyst.

However, when the ceramic support in the form of a honeycomb, etc. is prepared, a catalyst including an active metal supported on a ceramic (e.g. titania) powder support is mixed with an additive such as a binder, a reinforcing material, etc., and then multistage processes including kneading, injection, molding, etc. are performed. Therefore, the preparation process is highly complex, and it is difficult to perform production, installation, and maintenance works due to a large amount of scattering dust generated during the preparation process.

In addition, a large amount of various additives such as a binder, a reinforcing material, etc. is used to enhance the binding strength between a ceramic support and a denitrification catalyst raw material in the preparation of the ceramic support in the form of a honeycomb, etc. As a result, denitrification performance of a catalyst is degraded, and thus it is required that a large amount of an expensive active metal oxide which is a catalyst raw material be used.

Additionally, a denitrification catalyst using the ceramic support in the form of a honeycomb, etc. exhibits somewhat reduced denitrification efficiency because exhaust gas penetrates through the denitrification catalyst in one direction for a short period of retention, and it is also difficult to regenerate a denitrification catalyst fouled by carbonization or ammonium salts.

SUMMARY

The present inventors have ardently conducted research to solve the above-described problems of a denitrification catalyst for a vessel according to the present invention, using ceramic nanotubes grown on a porous metal structure and including an active metal highly dispersed as a nano-thin film layer on inner and outer surfaces of the ceramic nanotubes through a deposition or supporting process, and a preparation method thereof, and found that a novel, economical, and high-efficiency catalyst for denitrifying exhaust gas in a vessel may be prepared by the processes of: manufacturing a metal structure made of a titanium or aluminum metal in a three-dimensional shape rather than in an existing powder or honeycomb form and having a plurality of pores formed such that exhaust gas penetrates through the pores in multiple directions; growing ceramic nanotubes with a high specific surface area on the metal structure through anodic oxidation; and highly dispersing a small amount of an active metal as a nano-thin film layer on inner and outer surfaces of the ceramic nanotubes through a deposition or supporting process. Therefore, the present invention has been completed based on the facts.

Therefore, the present invention is directed to providing a high-efficiency denitrification catalyst for a vessel, which is prepared by growing ceramic nanotubes on the surface of the metal structure through anodic oxidation and highly dispersing a small amount of an active metal as a nano-thin film layer on inner and outer surfaces of the ceramic nanotubes through a deposition or supporting process, so that excellent economic feasibility and excellent catalytic performance are exhibited, and a preparation method thereof.

According to one aspect of the present invention, there is provided a denitrification catalyst for a vessel, using ceramic nanotubes grown on a porous metal structure, which includes: a porous metal structure having a plurality of pores formed between metal supports such that exhaust gas penetrates through the pores in multiple directions; ceramic nanotubes grown on the porous metal structure through anodic oxidation; and an active material uniformly and highly dispersed as a nano-thin film layer on inner and outer surfaces of the ceramic nanotubes through a deposition or supporting process.

According to another aspect of the present invention, there is provided a method of preparing a denitrification catalyst for a vessel, using ceramic nanotubes grown on a porous metal structure through anodic oxidation, which includes: i) manufacturing a porous metal structure allowing exhaust gas to penetrate through the structure in multiple directions; ii) preparing ceramic nanotubes on a surface of the porous metal structure through anodic oxidation; iii) highly dispersing, through a deposition or supporting process, an active material as a nano-thin film layer or nanoparticles on the porous metal structure including the ceramic nanotubes grown thereon; iv) drying the porous metal structure including the active material highly dispersed as a nano-thin film layer or nanoparticles on a surface of the ceramic nanotube through a deposition or supporting process; and v) firing the dried porous metal structure to finally prepare a denitrification catalyst.

A denitrification catalyst according to the present invention, using ceramic nanotubes grown on a porous metal structure and including an active metal highly dispersed as a nano-thin film layer on inner and outer surfaces of the ceramic nanotubes through a deposition or supporting process, uses a porous metal structure with a high specific surface area having a plurality of pores formed such that exhaust gas or gas penetrates through the pores in multiple directions and manufactured in a three-dimensional shape such as the form of a mesh, a foil, or a wire rather than in a powder or honeycomb form, so that the system for denitrifying exhaust gas can be more easily produced, installed, and maintained. Also, since additives such as a binder, a reinforcing material, etc. used in the manufacture of the structure in a powder or honeycomb form are not used, better catalytic performance can be achieved even with a small amount of expensive active metal.

In addition, since ceramic nanotubes with a high specific surface area are grown on the porous metal structure to manufacture a three-dimensional structure, a specific surface area is further increased, and thus a small amount of expensive active metal can be used to prepare a high-efficiency denitrification catalyst in which an active metal is highly dispersed as a nano-thin film layer on the surfaces of ceramic nanotubes through a deposition or supporting process, thereby excellent productivity and excellent economic feasibility can be achieved.

In addition, the denitrification catalyst according to the present invention can be applied to various fields including a power plant, an incinerator, the paper industry, the cement industry, the glass industry, a large-sized diesel vehicle, a diesel agricultural machinery, a railway vehicle engine, an industrial small/medium-sized power generator engine, etc. as well as a vessel.

In addition, since the shape of the porous metal structure included in the denitrification catalyst for a vessel according to the present invention can be varied to take the form of a circle, a rectangle, etc. in accordance with the structure of a denitrification system for a vessel, the denitrification catalyst can be minimally and optimally installed in a limited space in a vessel, the installation is easy, and maintenance is convenient.

DETAILED DESCRIPTION

Hereinafter, the present invention will be described in more detail.

A high-efficiency denitrification catalyst for a vessel according to an embodiment of the present invention, in which an active metal is highly dispersed on ceramic nanotubes grown on a porous metal structure through a deposition or supporting process, includes: a porous metal structure having a plurality of pores formed between metal supports such that exhaust gas penetrates through the pores in multiple directions; ceramic nanotubes grown on the porous metal structure through anodic oxidation; and an active material uniformly and highly dispersed as a nano-thin film layer on inner and outer surfaces of the ceramic nanotubes through a deposition or supporting process.

The denitrification catalyst for a vessel according to the present invention is differentiated by the fact that a three-dimensional metal structure including ceramic nanotubes, which is an integration of ceramic nanotubes and a metal structure where the ceramic nanotubes were grown on a surface of the metal structure through anodic oxidation, is manufactured, and a small amount of an active metal is highly dispersed as a nano-thin film layer on inner and outer surfaces of the nanotubes through thin film deposition.

In addition, the denitrification catalyst is differentiated by the fact that ceramic nanotubes are immersed in a solution in which an active metal precursor is dissolved so as to include the active metal highly dispersed on inner and outer surfaces of the nanotubes.

The porous metal structure according to the present invention, which is a metal structure in a three-dimensional shape rather than in a powder or honeycomb form, may be manufactured by a simplified process compared to a catalyst in the form of a honeycomb, a plate, corrugation, etc., which is prepared through multistage processes including kneading, injection, molding, etc. using a conventional powder catalyst and additives, and thus the production, installation, and maintenance are made easy. In addition, the metal structure in a three-dimensional shape may be realized in various shapes such as a circle, a rectangle, etc., and thus the structure and shape of a denitrification system may be varied in accordance with a limited space in a vessel. Therefore, a denitrification catalyst system optimized for a vessel space, for example, a SCR catalyst for denitrifying exhaust gas in a vessel may be prepared.

According to an embodiment of the present invention, the porous metal structure may be manufactured from titanium, aluminum, or an alloy thereof in the form of a mesh, a foil, or a wire.

As the metal structure in the form of a mesh or a foil, only one type of structure in the form of a mesh or a foil may be used, or it may include a plurality of structural types, a mesh or a foil, by having one type stacked on top of the other type.

The metal structure in the form of a wire may be in the form of demister in which the wire is configured in a regular or irregular direction.

The physical shapes, such as a length, a height, a width, etc., of the metal structure in the form of a mesh, a foil, or a wire may be varied to form various shapes such as a circle, a rectangle, etc.

Therefore, the form of the metal structure used to prepare the denitrification catalyst for a vessel according to the present invention may be varied in accordance with the spatial structure in which a denitrification system for a vessel is installed.

Figure 1:
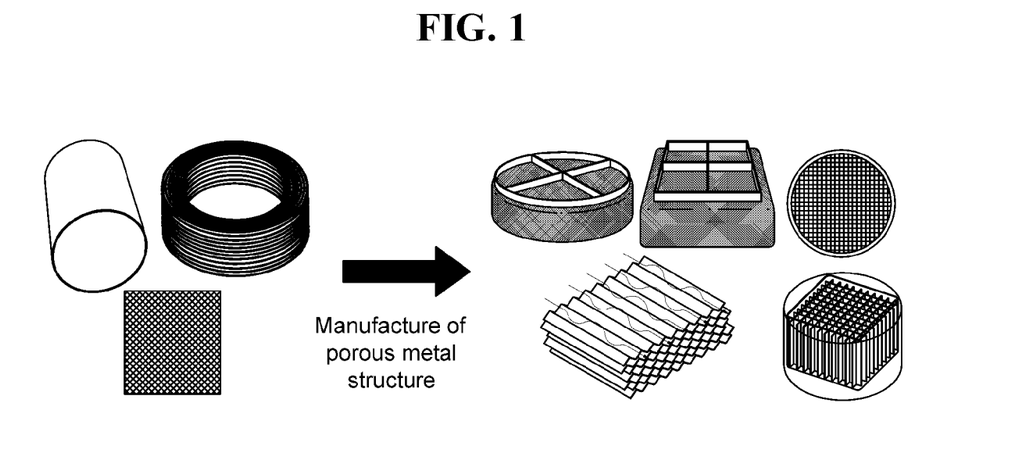
FIG. 1 is an image of a porous metal structure manufactured based on titanium or aluminum in the form of a mesh, a foil, or a wire according to an embodiment of the present invention.

FIG. 1 is an image of a porous metal structure manufactured in the form of a mesh, a foil, or a wire according to an embodiment of the present invention.

Referring to FIG. 1, the porous metal structure manufactured in the form of a mesh, a foil, or a wire is a porous metal structure in a three-dimensional form, which has a plurality of pores formed such that exhaust gas penetrates through the pores in multiple directions.

Figure 2:
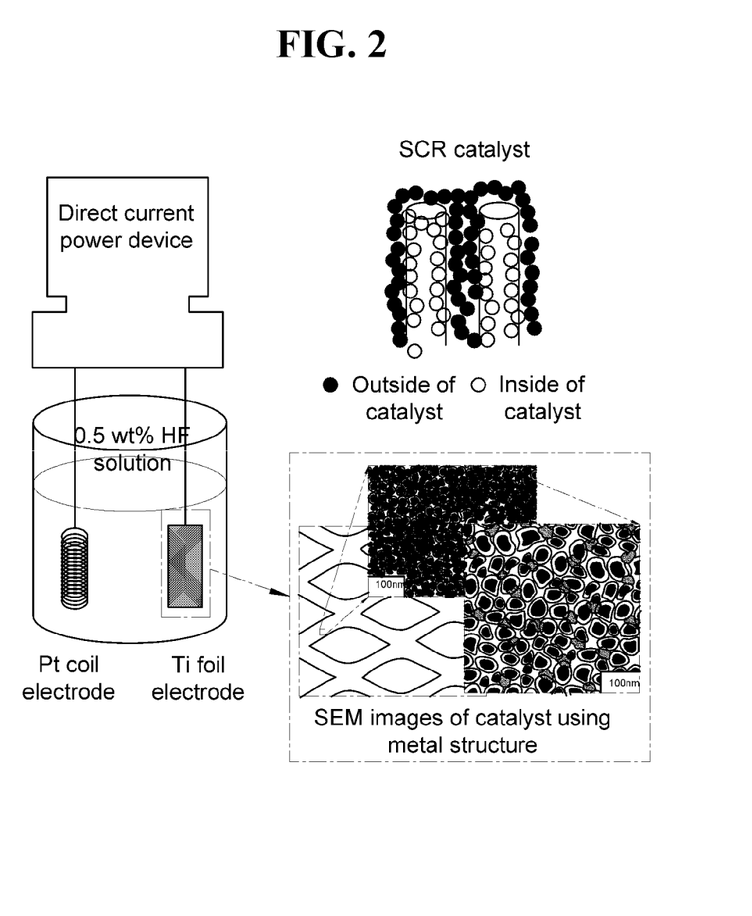
FIG. 2 is an image of ceramic nanotubes grown on a porous metal structure through anodic oxidation according to an embodiment of the present invention.

FIG. 2 is an image of ceramic nanotubes grown on a porous metal structure through anodic oxidation according to an embodiment of the present invention.

Referring to FIG. 2, the anodic oxidation for preparing ceramic nanotubes with a high specific surface area may be performed by using, as the two counter electrodes in an electrolyte solution, platinum or carbon as a negative electrode and the porous metal structure as a positive electrode, and applying a constant voltage to the two electrodes through a direct-current power supplier.

Figure 3:
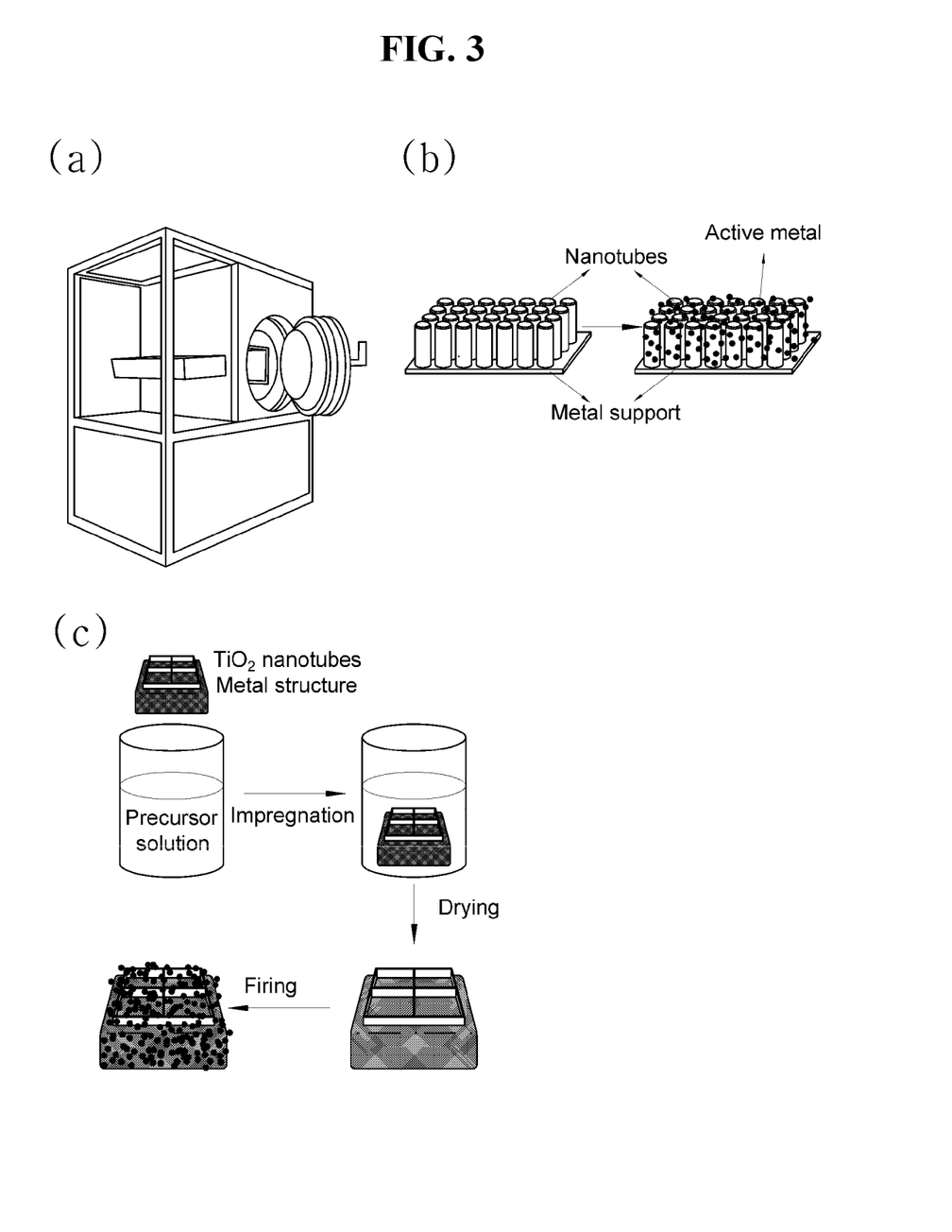
FIG. 3 is a set of images illustrating a method of highly dispersing an active metal as a nano-thin film layer through a deposition or supporting process according to an embodiment of the present invention.

FIG. 3 is a set of images illustrating a method of highly dispersing an active metal as a nano-thin film layer through a deposition or supporting process according to an embodiment of the present invention.

Referring to FIG. 3, an active metal is highly dispersed as a nano-thin film layer on inner and outer surfaces of the ceramic nanotubes grown on the porous metal structure through anodic oxidation, by depositing the active metal on the nanotubes through thin film deposition or by supporting the active metal on the nanotubes using an active metal precursor solution.

Specifically, FIG. 3(A) is an image of a thin film deposition system, and FIG. 3(B) is an image illustrating a method of coating inner and outer surfaces of the nanotubes with an active metal using an atomic layer deposition system. Also, FIG. 3(C) is an image illustrating a method of supporting an active metal on inner and outer surfaces of nanotubes by immersing the nanotubes in an active metal precursor solution.

The active metal is highly dispersed as a nano-thin film layer on inner and outer surfaces of the ceramic nanotubes through thin film deposition commonly used in the semiconductor manufacturing process. Examples of the thin film deposition include physical vapor deposition, chemical vapor deposition, and atomic layer deposition, and any one of them may be used.

In addition, the active metal may be supported on ceramic nanotubes using a precursor solution prepared by dissolving the active metal precursor in distilled water and an organic solvent.

By highly dispersing a small amount of an active metal as a nano-thin film layer on inner and outer surfaces of the ceramic nanotubes with a high specific surface area through a deposition or supporting process, a denitrification catalyst with excellent performance may be prepared.

Figure 4:
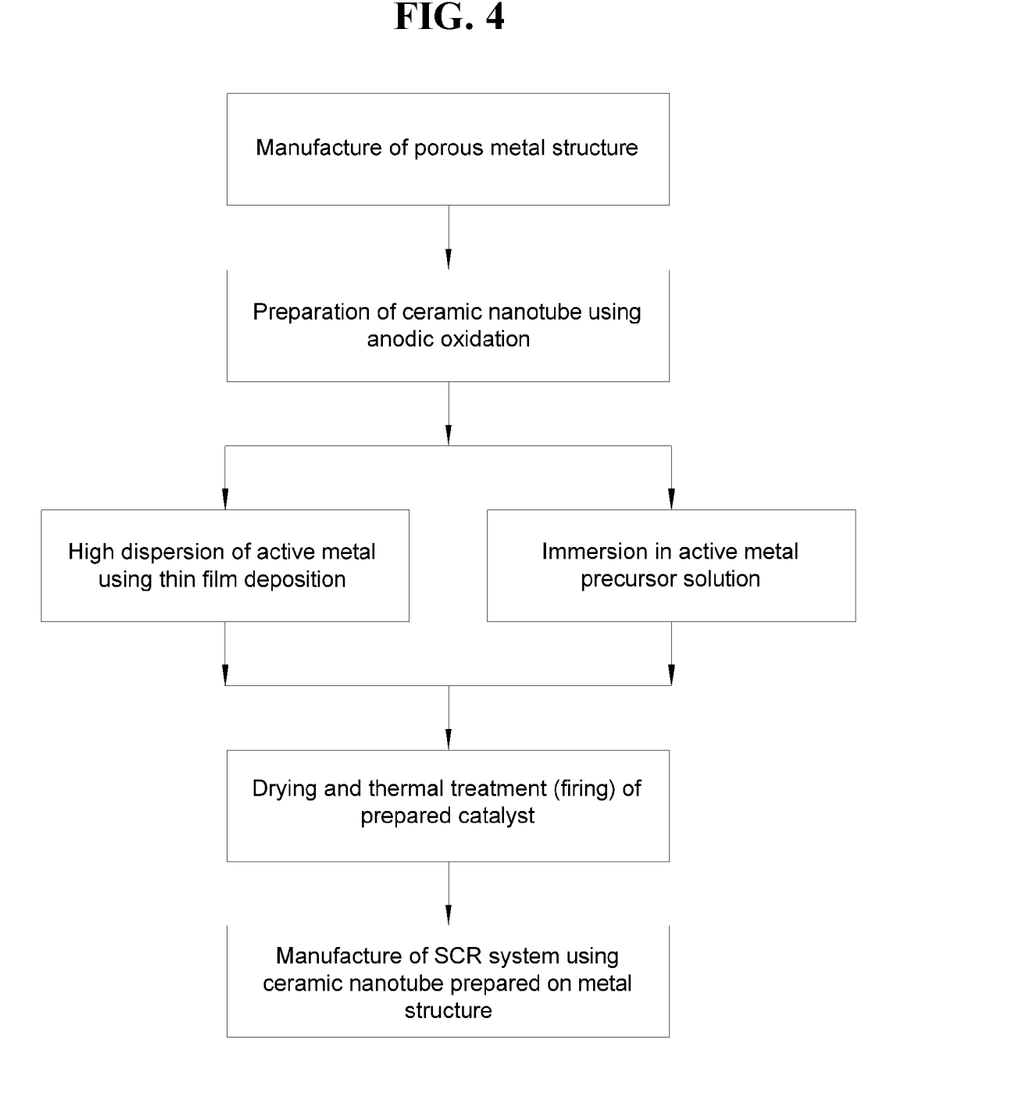
FIG. 4 is a flow chart illustrating the sequence of a preparation method of a high-efficiency denitrification catalyst for a vessel, in which an active metal is highly dispersed on ceramic nanotubes grown on a porous metal structure through a deposition or supporting process, according to an embodiment of the present invention.

FIG. 4 is a flow chart illustrating the sequence of a preparation method of a denitrification catalyst for a vessel, in which an active metal is highly dispersed as a nano-thin film layer on ceramic nanotubes grown on a porous metal structure through a deposition or supporting process, according to an embodiment of the present invention.

According to an embodiment of the present invention, the ceramic nanotubes may be titania nanotubes or alumina nanotubes which are prepared from a titanium or aluminum metal through anodic oxidation.

According to an embodiment of the present invention, the active metal to be deposited or supported on the ceramic nanotubes may include a main active metal and an auxiliary active metal.

As the main active metal, vanadium oxide may be used, and as the auxiliary active metal, tungsten oxide, molybdenum oxide, cobalt oxide, iron oxide, chromium oxide, copper oxide, manganese oxide, nickel oxide, cesium oxide, niobium oxide, etc. may be used, but the present invention is not limited thereto.

The active metal may be included in an amount of 0.1 to 10.0 wt % with respect to 100 wt % of the ceramic nanotubes.

According to an embodiment of the present invention, the porous metal structure has a porosity of 60% or more.

When a porosity of the porous metal structure does not satisfy the above range, a clogging phenomenon may occur due to fouling by carbonization or ammonium salts, or serious phenomena such as a pressure drop may occur due to a problem in exhaust gas flow. Therefore, the porous metal structure needs to have a degree of porosity above a certain level.

The ceramic nanotube according to the present invention preferably has a specific surface area of 500 to 1,000 m²/g, a pore size of 500 to 5000 Å, and a length of 500 nm to 5 μm.

Figure 5A:
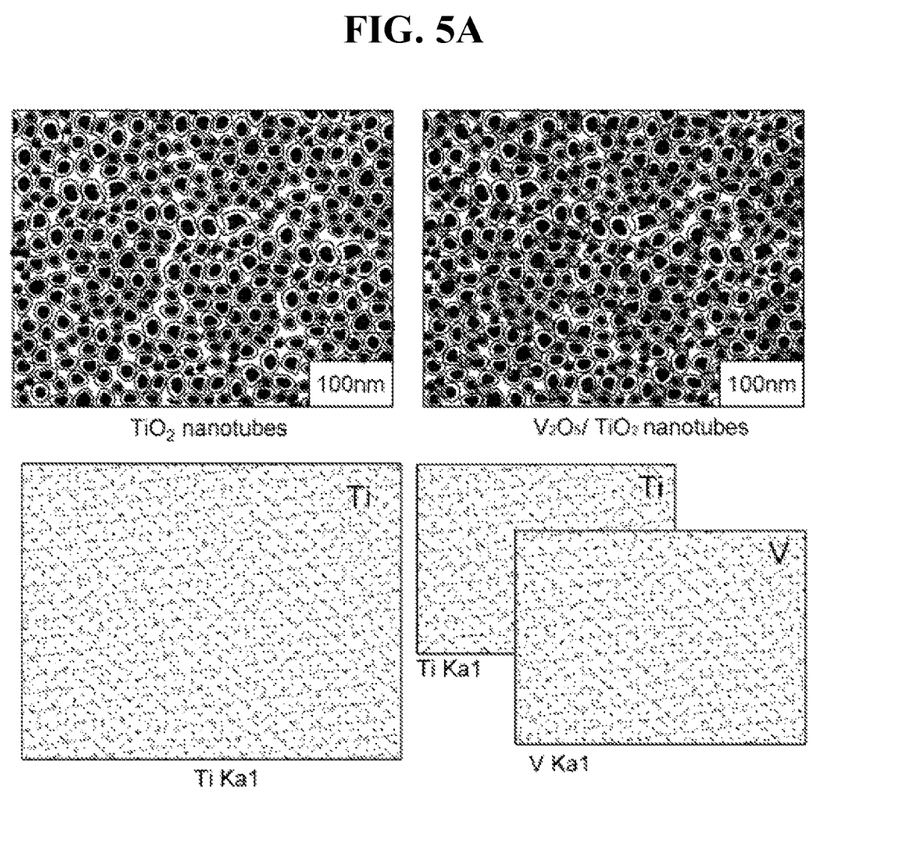
FIG. 5A is a set of the SEM images and EDS element distribution maps of titania nanotubes and an active metal dispersed on the nanotubes according to an embodiment of the present invention.
Figure 5B:
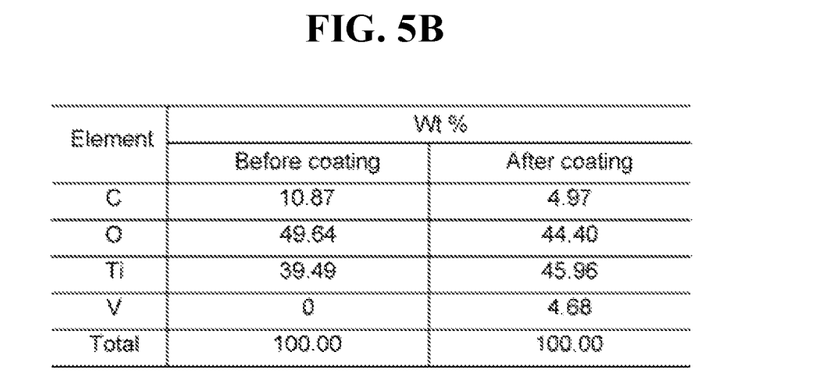
FIG. 5B is a table illustrating elemental abundance.

FIG. 5A is a set of the SEM images and EDS element distribution maps of titania nanotubes and an active metal dispersed on the nanotubes according to an embodiment of the present invention, and FIG. 5B is a table illustrating elemental abundance.

Figure 6:
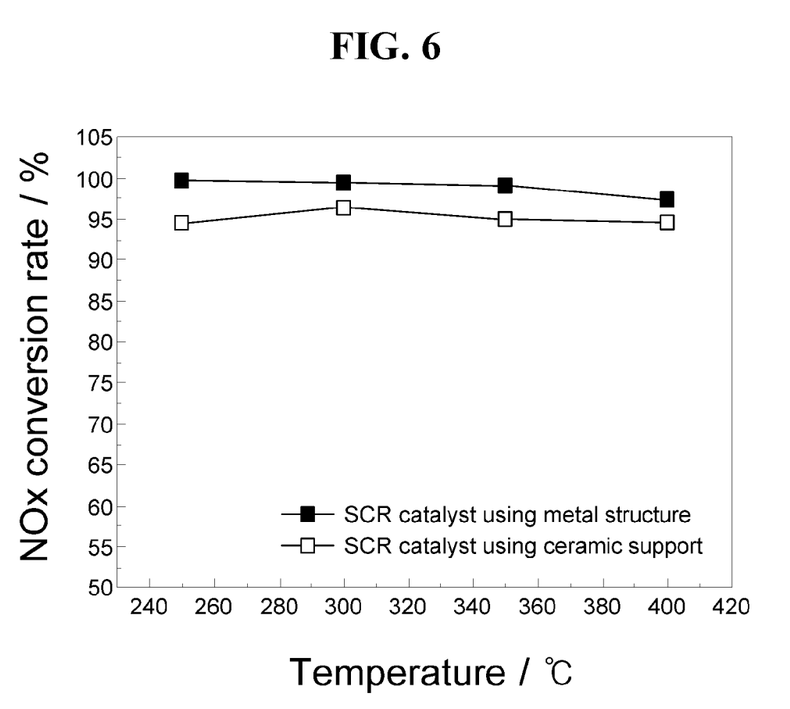
FIG. 6 is a graph of the performance evaluation results illustrating that a SCR catalyst (metal-based SCR catalyst) using a porous metal structure according to an embodiment of the present invention exhibits a higher conversion rate of $NO_x$ than that of a conventional SCR catalyst (ceramic-based SCR catalyst) using a ceramic support.

FIG. 6 is a graph of the performance evaluation results illustrating that a SCR catalyst (metal-based SCR catalyst) using a porous metal structure according to an embodiment of the present invention exhibits a higher conversion rate of $NO_x$ than that of a conventional SCR catalyst (ceramic-based SCR catalyst) using a ceramic support.

Figure 7:
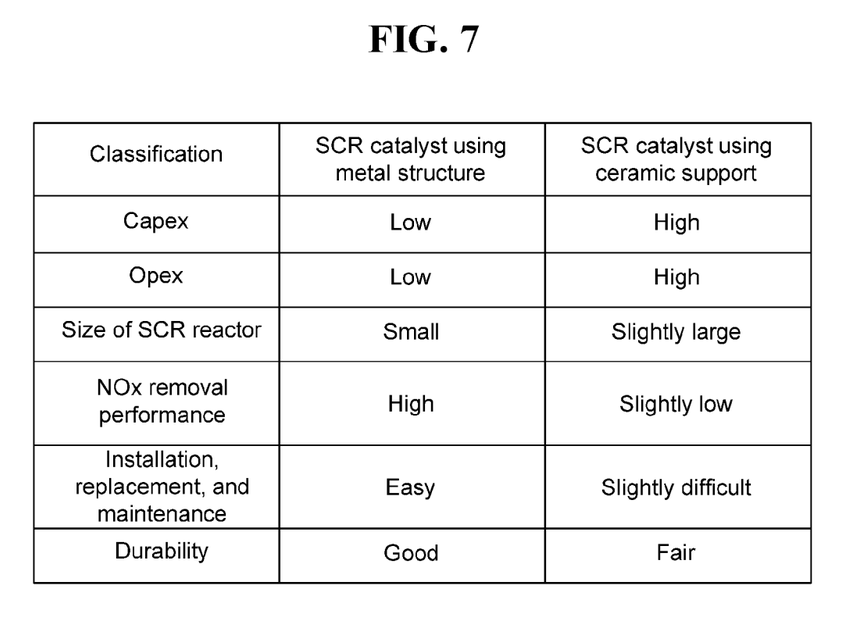
FIG. 7 is a table illustrating the comparative analysis of advantages and disadvantages of a SCR catalyst using a porous metal structure according to an embodiment of the present invention and a conventional SCR catalyst using a ceramic support.

FIG. 7 is a table illustrating the comparative analysis of advantages and disadvantages of a SCR catalyst using a porous metal structure according to an embodiment of the present invention and a conventional SCR catalyst using a ceramic support.

Figure 8A:
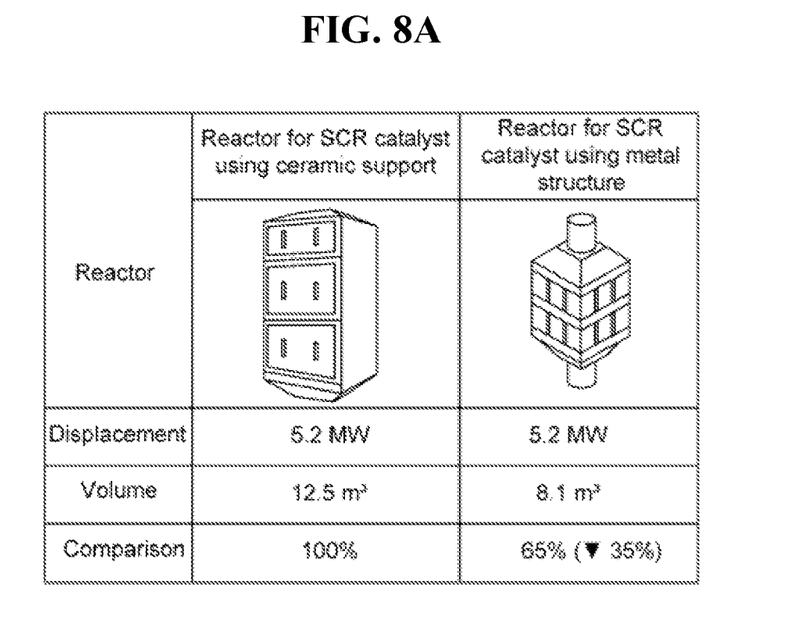
FIG. 8A is a table illustrating the comparative analysis of sizes of a reactor for a SCR catalyst using a porous metal structure according to an embodiment of the present invention and a reactor for a conventional SCR catalyst using a ceramic support.
Figure 8B:
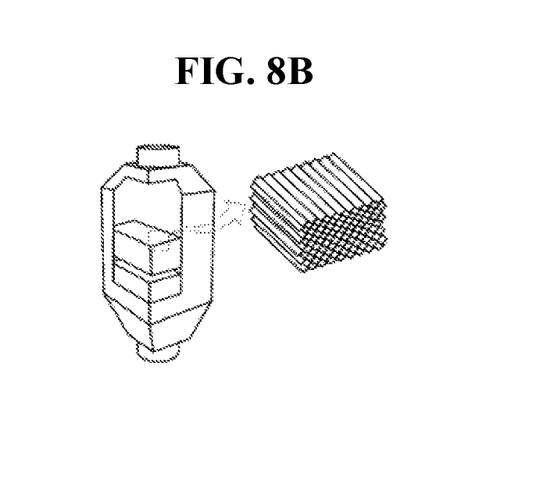
FIG. 8B is an image of a reactor equipped with a SCR catalyst using a metal structure.

FIG. 8A is a table illustrating the comparative analysis of sizes of a reactor for a SCR catalyst using a porous metal structure according to an embodiment of the present invention and a reactor for a conventional SCR catalyst using a ceramic support, and FIG. 8B is an image of a reactor equipped with a SCR catalyst using a metal structure.

Referring to FIG. 8, by applying the SCR catalyst using a porous metal structure according to an embodiment of the present invention, the structure of a system for denitrifying exhaust gas may be easily varied and downsized such that it takes up a minimum space in a limited space in a vessel. Also, the system is easily installed, replaced, and maintained by applying a cartridge type catalyst to the SCR catalyst reactor, and thus Capex and Opex may be reduced to maximize profits.

According to another embodiment of the present invention, there is provided a method of preparing a denitrification catalyst for a vessel, using ceramic nanotubes grown on a porous metal structure through anodic oxidation, which includes:

i) manufacturing a porous metal structure allowing exhaust gas to penetrate through the structure in multiple directions;

ii) preparing ceramic nanotubes on a surface of the porous metal structure through anodic oxidation;

iii) highly dispersing, through a deposition or supporting process, an active material as a nano-thin film layer or nanoparticles on the porous metal structure including the ceramic nanotubes grown thereon;

iv) drying the porous metal structure including the active material highly dispersed as a nano-thin film layer or nanoparticles on a surface of the ceramic nanotube through a deposition or supporting process; and v) firing the dried porous metal structure to finally prepare a denitrification catalyst.

The porous metal structure may be manufactured from a titanium or aluminum metal in the form of a mesh, a foil or a wire such that exhaust gas penetrates through the structure in multiple directions rather than in one direction.

As the metal structure in the form of a mesh or a foil, only one type of structure in the form of a mesh or a foil may be used, or it may include a plurality of structural types, a mesh or a foil, by having one type stacked on top of the other type.

The metal structure in the form of a wire may be in the form of demister in which the wire is configured in a regular or irregular direction.

The physical shapes, such as a length, a height, a width, an angle, etc., of the metal structure in the form of a mesh, a foil, or a wire may be varied in accordance with the structure of a denitrification system.

The anodic oxidation for preparing ceramic nanotubes may be performed by using, as the two counter electrodes in an electrolyte solution, platinum or carbon as a negative electrode and the porous metal structure as a positive electrode, and applying a constant voltage to the two electrodes through a direct-current power supplier.

An electrolyte used in the anodic oxidation is preferably an aqueous 0.1 to 1.0 M hydrofluoric acid solution, and an aqueous mixed solution of ethylene glycol or glycerol and 0.1 to 1.0 M ammonium fluoride may also be used as the electrolyte.

To the electrolyte, 0.5 to 2 M ammonium sulfate, phosphoric acid, or sodium hydroxide may also be added as an additional additive.

The anodic oxidation is preferably performed for 10 to 60 minutes. In this process, a voltage of 10 to 80 V is preferably applied to two electrodes.

The anodic oxidation needs to be performed under conditions with optimized electrolyte concentration, applied voltage, and time in order to obtain the optimum shape of ceramic nanotube.

In order to highly disperse (apply) the active metal or active material as a nano-thin film layer on inner and outer surfaces of the ceramic nanotubes, thin film deposition commonly used in the semiconductor manufacturing process is used, and the thin film deposition may be performed through a deposition technology such as atomic layer deposition, physical vapor deposition, chemical vapor deposition, etc.

In addition, as another method of highly dispersing (supporting) an active material on inner and outer surfaces of the ceramic nanotubes, an active metal precursor may be dissolved in a solution to prepare a precursor solution.

In order to highly disperse the precursor solution thus prepared as a nano-thin film layer on inner and outer surfaces of the ceramic nanotubes, a supporting process is performed. The supporting process of the active metal may be performed by various methods, that is, by spreading, spraying, or supporting the active metal on the surface of the porous metal structure.

In this case, an active metal precursor may be included in an amount of 0.1 to 10.0 wt % with respect to 100 wt % of the ceramic nanotubes.

The porous metal structure on which the active metal has been supported on the surfaces of ceramic nanotubes may be dried in a drying furnace at 100 to 120° C. for 1 to 3 hours. The porous metal structure thus dried may be thermally treated by firing at 400 to 600° C. for 3 to 6 hours. In this case, the form of ceramic nanotubes is converted from amorphous oxides to crystalline oxides with a specific crystal structure, and active metal components are thermally treated so as to have a form of metal oxide.

In particular, in the case of titania, the thermal treatment is a process for crystallizing an amorphous oxide layer to form an anatase structure and is preferably performed at 400 to 600° C. When the thermal treatment is performed at less than 400° C., it may be difficult to form an anatase structure through crystallization, and when the thermal treatment is performed at greater than 600° C., a rutile structure may be formed.

Crystals formed by the thermal treatment affect the contaminant removal efficiency, and when crystals are present mainly in an anatase structure, the crystals effectively react with contaminants.

In this case, it is important to set up an environment so that the oxide layer is easily formed under an air atmosphere during the thermal treatment, and the thermal treatment is preferably performed for 3 to 6 hours.

According to an embodiment of the present invention, it is preferable to use the active metal in the form of a precursor in thin film deposition or to use the active metal as a precursor solution prepared by mixing with a solvent. Also, it is preferable that the active metal highly dispersed as a nano-thin film layer through a deposition or supporting process take the form of oxide after the thermal treatment through firing.

In the step iii), the active metal may be deposited as a nano-thin film layer with a thickness of several nanometers on inner and outer surfaces of ceramic nanotubes through thin film deposition using an active metal precursor.

In addition, a precursor solution prepared by mixing the active metal precursor with a solvent may be used to support the active metal on ceramic nanotubes.

The solvent is preferably distilled water or an organic solvent such as ethanol, etc.

According to an embodiment of the present invention, the step iii) may be repeated in the same manner.

By repeating the step iii) several times, the active metal may be more uniformly and highly dispersed on inner and outer surfaces of the ceramic nanotubes grown on the porous metal structure.

According to an embodiment of the present invention, the drying may be performed at 100 to 120° C. for 1 to 3 hours.

According to an embodiment of the present invention, the thermal treatment through firing may be performed at 400 to 600° C. for 3 to 6 hours.

The drying and firing processes may be performed to remove moisture and impurities from the precursor solution and convert amorphous oxides into active crystalline oxides.

The denitrification catalyst for a vessel using ceramic nanotubes grown on a porous metal structure according to the present invention is composed of an inlet through which exhaust gas is introduced and an outlet through which exhaust gas is discharged at a rear of the inlet. The active metal may be highly dispersed as a nano-thin film layer on nanotubes in the inlet through a deposition or supporting process, and an odor neutralizer may be applied onto nanotubes located in the outlet.

The denitrification catalyst may allow exhaust gas introduced in one direction to firstly penetrate through the inlet in which the active metal is supported so as to remove contaminants, and then allow the gas from which the contaminants are removed to penetrate through the outlet coated with an odor neutralizer so as to remove an odor of gas and exhibit the corrosion resistant effect.

The odor neutralizer may include a titanium or zirconium metal oxide.

Hereinafter, the present invention will be described in further detail with reference to embodiments thereof. However, it should be understood by those skilled in the art that the following embodiments disclosed herein are provided to aid understanding the present invention, and are not intended to limit the scope of the present invention.

Example 1: Manufacture of Porous Titanium Metal Structure with TiO$_2$ Nanotube Growth A titanium metal structure in the form of a mesh, a foil, or a wire was anodized using an aqueous 0.5 M hydrofluoric acid solution at 20 V for 20 minutes (an electrolyte is maintained at a constant temperature of 25° C.), then dried in a dryer at 120° C. for 2 hours, and thermally treated under an oxygen atmosphere at 500° C. for 3 hours to manufacture a porous metal structure on which TiO$_2$ nanotubes were grown.

In this case, the shape of the TiO$_2$ nanotubes manufactured under the above condition was confirmed by a scanning electron microscope (SEM). As a result, it was confirmed that the TiO$_2$ nanotubes were uniformly grown with a constant shape of a diameter of 100 nm, a thickness of 20 nm, and a length of 1 to 2 In addition, it was confirmed through X-ray diffraction that the crystal structure of amorphous TiO$_2$ nanotubes was converted into an anatase structure after thermal treatment under an oxygen atmosphere.

Example 2: Preparation of Active Metal Supported TiO$_2$ Nanotubes

In order to support an active metal on the TiO$_2$ nanotube prepared in Example 1, an aqueous precursor solution containing a 0.06 M vanadium precursor and 0.5 M oxalic acid was prepared, and a porous titanium metal structure with TiO$_2$ nanotube growth was impregnated with the precursor solution. The impregnation was repeated several times in the same manner to support a predetermined amount of an active metal precursor on the surfaces of TiO$_2$ nanotubes, and the resultant structures were dried at 120° C. for 2 hours and thermally treated through firing at 500° C. for 4 hours to finally obtain the structure in which an active metal was supported on inner and outer surfaces of TiO$_2$ nanotubes.

In this case, it can be confirmed through SEM analysis and energy dispersive X-ray spectroscope that vanadium oxide, which is an active metal, was highly dispersed (supported) on the surfaces of TiO$_2$ nanotubes. Also, it can be confirmed through X-ray diffraction analysis that the crystal structure of a vanadium precursor was converted into a crystal structure in the form of vanadium oxide.

The porous titanium metal structure manufactured with a size of a diameter of 50 mm and a length of 100 mm was used to finally prepare a denitrification catalyst for a vessel through Examples 1 and 2. The catalytic performance of the denitrification catalyst prepared under conditions as shown in Table 1 below was measured.

TABLE 1

| | |
|---|---|
| Reaction temperature | 200 to 450° C. |
| Spatial velocity | 5,000 to 20,000/hr |
| Molar ratio of ammonia/nitrogen oxide | 1.0 |
| Nitrogen oxide | 300 to 600 ppm |
| Oxygen | 4 to 8% |

While the temperature was raised at 5° C./min at an interval of 50° C. in a range of 200 to 450° C. under the conditions as shown in Table 1, the performance of the denitrification catalyst was analyzed. As a result, catalytic activity of 90% or more was exhibited at 300 to 400° C., and a peak activity of 98% was exhibited at 350° C.

While the present invention has been particularly described in detail above, it will be clear to those skilled in the art that the detailed descriptions are only exemplary and the scope of the present invention is not limited thereto. It will be understood by those skilled in the art that various applications and changes may be made without departing from the spirit and scope of the.

Therefore, the substantial scope of the present invention is just defined by the scope of the appended claims and their equivalents.

The SCR catalyst using ceramic nanotubes grown on a porous metal structure according to the present invention exhibits excellent productivity and excellent economic feasibility and can be applied as a denitrification catalyst to various fields including a power plant, an incinerator, the paper industry, the cement industry, the glass industry, a large-sized diesel vehicle, a diesel agricultural machinery, a railroad engine, an industrial small/medium-sized power generator engine, etc. as well as a vessel.

In particular, the SCR catalyst can be minimally and optimally installed in a limited space in a vessel and conveniently maintained; therefore, it can be applied in a vessel field, specifically as a denitrification catalyst for a vessel.

The invention claimed is:

1. A denitrification catalyst using ceramic nanotubes grown on a porous metal structure, the denitrification catalyst comprising:
   a porous metal structure having a plurality of pores formed between metal supports such that exhaust gas penetrates through the pores in multiple directions;
   ceramic nanotubes grown on the porous metal structure through anodic oxidation; and
   an active material uniformly and highly dispersed as a nano-thin film layer on inner and outer surfaces of the ceramic nanotubes through a deposition or supporting process.

2. The denitrification catalyst of claim 1, wherein the porous metal structure is manufactured from titanium, aluminum, or an alloy thereof in the form of a mesh, a foil, or a wire.

3. The denitrification catalyst of claim 1, wherein the porous metal structure has a porosity of 60% or more.

4. The denitrification catalyst of claim 1, wherein the ceramic nanotubes are titania nanotubes or alumina nanotubes.

5. The denitrification catalyst of claim 1, wherein the active material includes vanadium oxide as a main active material and one or more selected from the group consisting of tungsten oxide, molybdenum oxide, cobalt oxide, iron oxide, chromium oxide, copper oxide, manganese oxide, nickel oxide, cesium oxide, and niobium oxide as an auxiliary active material.

6. The denitrification catalyst of claim 1, wherein the active material is included in an amount of 0.1 to 10.0 wt % with respect to 100 wt % of the ceramic nanotubes.

7. The denitrification catalyst of claim 1, which is used in a vessel, a power plant, a vehicle, a railroad, or agriculture.

* * * * *